Feb. 13, 1962 A. S. ROBINSON 3,021,072

PRECISION INFINITE MEMORY INTEGRATOR

Filed March 1, 1960 2 Sheets-Sheet 1

INVENTOR.
ARTHUR S. ROBINSON
BY Charles J. Worth
AGENT

INVENTOR.
ARTHUR S. ROBINSON
BY Charles J. Worth
AGENT

United States Patent Office 3,021,072
Patented Feb. 13, 1962

3,021,072
PRECISION INFINITE MEMORY INTEGRATOR
Arthur S. Robinson, Allendale, N.J., assignor to The Bendix Corporation, a corporation of Delaware
Filed Mar. 1, 1960, Ser. No. 12,202
14 Claims. (Cl. 235—183)

This invention relates to high precision integrators having infinite memory for storing information and having nondestructive readout characteristics.

A device capable of performing integrating functions is essential for proper operation of automatic flight control systems. Standard techniques currently widely used for integration of alternating voltages include rate generators and other electromagnetic devices which are heavy and bulky. In addition, electromagnetic devices are slower responding and less reliable than solid state devices.

It is an object of this invention to provide an integrator having no moving parts.

Another object of this invention is to provide a solid state integrator which has infinite memory and nondestructive readout for storing information.

Another object of this invention is to provide a reliable integrator having precise and rapid response, and which is relatively small in size and light in weight.

Still another object of this invention is to provide a precision integrator which includes two synchronizers alternately connected by a pulse control circuit.

This invention contemplates an integrator adapted to receive command signals and includes a pair of synchronizers having their outputs connected to the integrator input to provide signals to be combined with the command signals. Means is included to provide control signals, corresponding to the algebraic sum of the command signals and the output signals of the pair of synchronizers. A control means alternately connects the control input of one of the synchronizers to the means providing the control signals and simultaneously connects the output of the same synchronizer to the integrator output.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

Figure 1:
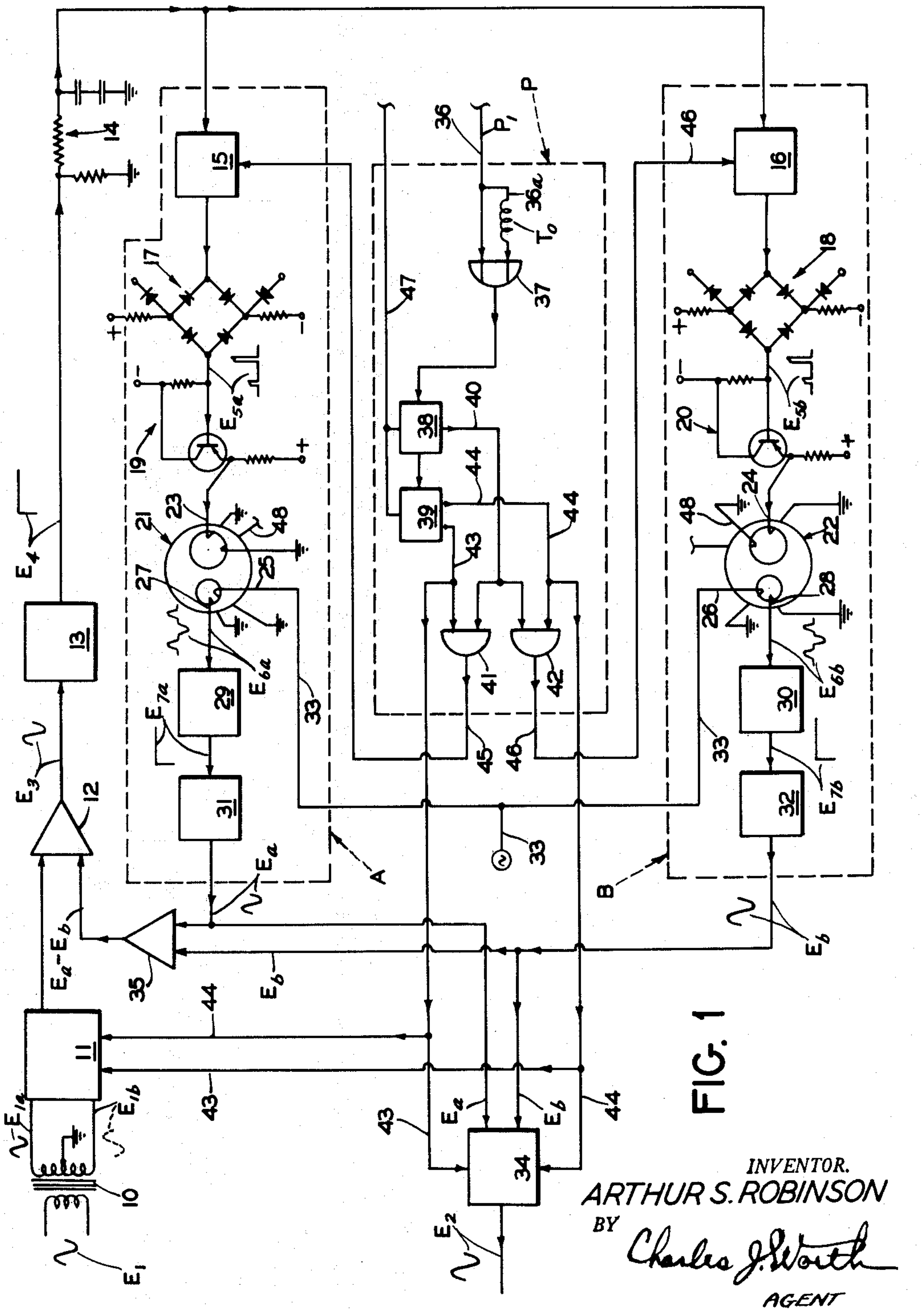
Figure 2:
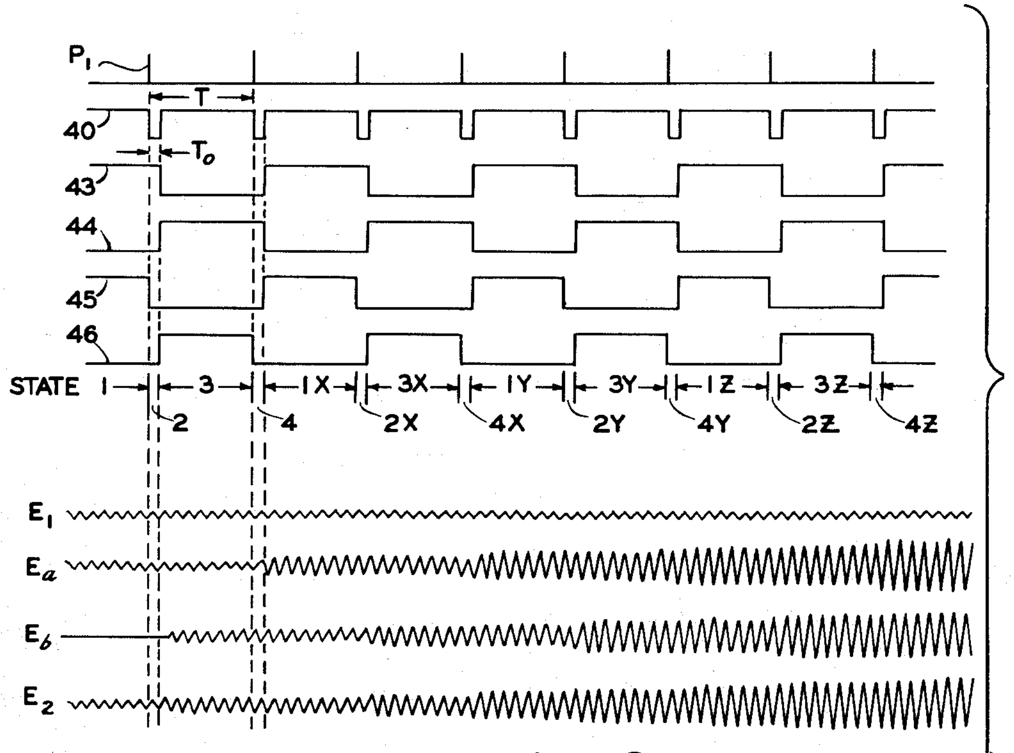
Figure 3:
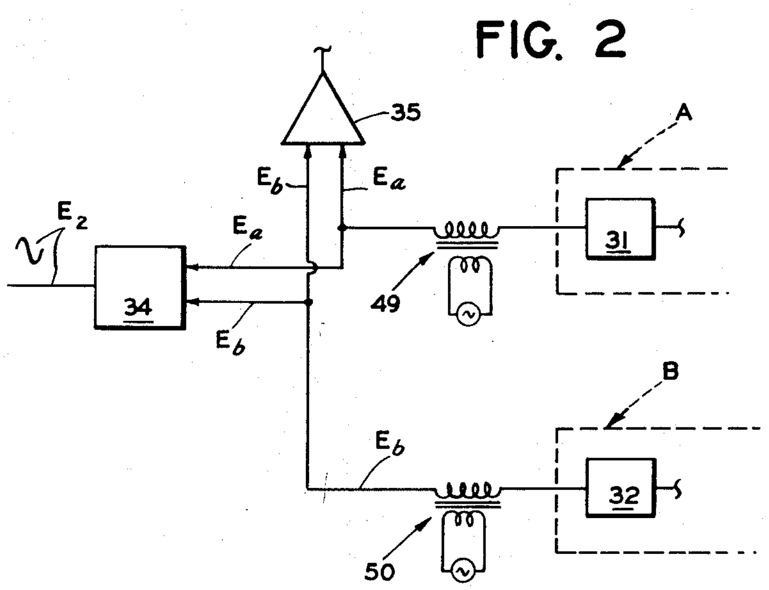

FIGURE 1 is a diagram of novel integrator constructed according to the invention, FIGURE 2 is a graphic illustration of waveforms and various high/low connections of the pulse control circuit of the integrator of FIGURE 1, and, FIGURE 3 is a diagram of a modification of the integrator of FIGURE 1.

Referring now to the drawings and particularly to FIGURE 1, a novel integrator constructed according to the invention having high resolution, excellent linearity and infinite memory includes two synchronizers of the character shown and described in co-pending patent applications Serial Nos. 8,317 and 8,318, filed February 12, 1960, and assigned to the same assignee of this patent application. In addition to incorporating two synchronizers, the novel integrator includes electronic switching and pulse techniques to accomplish the required functions as will be further described. Each of the two synchronizers, A and B, includes a transfluxor and a control gate, a pulse gate and a drive circuit for providing control signals to the transfluxor, a detector and a modulator. An amplifier, a phase sensitive demodulator and an R.C. filter may be common to both circuits, as may be required.

Although the above is the preferred combination of components, it will be seen that all the parts of the synchronizer required to provide control signals to the transfluxors may be common to both transfluxors.

Alternating voltage command signals $E_1$ are passed through a center tapped transformer 10 such that two alternating voltages $E_{1a}$ and $E_{1b}$, equal in magnitude to the input voltages $E_1$, are available. The voltages $E_{1a}$, are in phase with the reference carrier $E_1$ and the voltages $E_{1b}$ are 180° out of phase. An electronic switch 11 under the control of a pulse control circuit P connects either the voltages $E_{1a}$ or the voltages $E_{1b}$ to an amplifier 12, determined by the state of the integrator or, in other words, according to which synchronizer A or B is activated at that time. The amplifier 12 also receives alternating voltages representing $E_a$—$E_b$ which are the combined differential output of the two synchronizers A and B. The amplifier 12 presents alternating voltage signals $E_3$ to a phase sensitive demodulator 13. The signals $E_3$ are of a phase and amplitude corresponding to the algebraic sum of the input signals $E_{1a}$ or $E_{1b}$, and $E_a$—$E_b$ applied to amplifier 12. The demodulator 13 provides direct voltages $E_4$ corresponding in polarity and amplitude to the phase and amplitude of the signals $E_3$ from the amplifier 12. The output of the demodulator 13 is connected through an R.C. filter 14 to the input of the control gates 15 and 16 for alternately controlling synchronizers A and B. The R.C. filter 14 causes a lag in the direct voltages $E_4$. The control gates 15 and 16 are alternately energized by the pulse control circuit P.

The synchronizers A and B have similar components and operate in a similar manner. With the control gate 15 energized by the pulse control circuit P and the gate 16 de-energized, the lagging direct voltage output from the R.C. filter 14 is presented to the input of a pulse gate 17 of synchronizer A. The pulse gate 17 provided pulse signals $E_{5a}$, which vary in amplitude in accordance with the output of R.C. filter 14, to a current drive circuit 19 which applies current pulses to a control winding 23 of a transfluxor 21. The transfluxor 21 has a primary winding 25 and a secondary winding 27 inductively interconnected in the usual manner. The primary winding 25, connected to a source of alternating current by a circuit 33, induces a secondary flux in the transfluxor 21. The secondary winding 27, excited by the secondary flux, produces distorted output signals $E_{6a}$ which are applied to a detector circuit 29. The detector circuit 29 provides a direct voltage output $E_{7a}$ which is converted to alternating feedback voltage $E_a$ by a modulator 31.

When the control gate 16 of the circuit B is energized by pulse circuit P, the gate 15 is de-energized, and the output signals from the R.C. filter 14 are applied to a pulse gate 18 of the synchronizer B. The gate 18 provides pulse signals $E_{5b}$ to a current drive circuit 20 which applies current pulses to a control winding 24 of a transfluxor 22. The transfluxor 22 has a primary winding 26 excited by the alternating current from the conduit 33, and a secondary winding 28 which presents distorted signals $E_{6b}$ to a detector circuit 30. The detector circuit 30 provides a direct voltage output $E_{7b}$ which is applied to a modulator 32 and converted to the alternating voltage feedback $E_b$. The alternating voltages $E_a$ and $E_b$ corresponding to the signals $E_{6a}$ and $E_{6b}$, respectively, are presented to an electronic switch 34 and applied to an amplifier 35. The electronic switch 34 is controlled by the pulse circuit P and alternately connects the output $E_a$ of the modulator 31 of synchronizer A and the output $E_b$ of the modulator 32 of synchronizer B to the integrator output, dependent upon the state of the integrator as will be further described, to provide alternating output voltages $E_2$.

The control of the magnetization of the transfluxors 21 and 22 may be accomplished by the use of three techniques. The first technique has been described herein as converting the alternating voltages $E_3$ to lagging direct voltages and obtaining current drive pulses. The second technique utilizes voltages pulses to vary the magnetization of the transfluxor. The integrator shown in FIGURE 1 is then modified to eliminate the R.C. filter 14, and the current drive circuits 19 and 20 are replaced by voltage drive circuits (not shown). The third technique requires a further modification of the integrator of FIGURE 1 by additionally eliminating the demodulator 13. With this arrangement, the alternating voltage signals $E_3$ are applied to the pulse gate 17 or 18 through the associated control gate 15 or 16. The signals $E_3$ are peak sampled by the connected pulse gate and voltage pulses are applied to the control winding 23 or 24 of the associated transfluxor 21 or 22 by a voltage drive circuit (not shown) corresponding to the current drive circuit 19 or 20 of the synchronizers of FIGURE 1.

The pulse actuated control circuit P has a pulse input $P_1$, at a frequency or pulse interval T, which is presented to an OR gate 37 through a connection 36. A parallel connection 36*a* having means to provide a delay $T_0$, also connects the input of the pulse circuit P to the same gate. The gate 37 is connected to the input of a flip-flop 38 alternately providing high and low connections to energize and de-energize a line 40, and controlling a second flip-flop 39 in response to the pulses. The line 40 connects the flip-flop 38 to one side of two AND gates 41 and 42. A line 43 connects the flip-flop 39 to the second side of the AND gate 41, and a line 44 connects the same flip-flop 39 to the second side of the AND gate 42. The flip-flop 39 is also connected to the electronic switches 11 and 34 by lines 43 and 44. The output of the AND gate 41 is connected to the gate 15 by a line 45, while the output of the AND gate 42 is connected to the gate 16 by a line 46.

The flip-flops 38 and 39 have a reset control connection 47 interconnected with reset connections 48 associated with the transfluxors 21 and 22. By energizing the reset control connections 47 and 48, the transfluxors 21 and 22 are blocked oppositely to one another, and the flip-flops 38 and 39 are set to provide high connections to energize the lines 40 and 43. In this mode, the electronic switch 11 passes the alternating voltages $E_{1b}$ to the error amplifier 12. Since both transfluxors 21 and 22 are initially blocked and produce no signals, the signals from the amplifier 12 through the demodulator 13 and the R.C. filter 14 to the control gates 15 and 16 represent the input voltages $E_{1b}$. With lines 40 and 43 energized, the gate 15 is energized by AND gate 41 and line 45. The output from the R.C. filter 14 is applied to the pulse gate 17 to be converted to pulse signals and then applied to the control winding 23 to vary the magnetization (partially unblock) of the transfluxor 21. The signals $E_{6a}$ now produced by the transfluxor 21 are presented to the detector circuit 29 and converted to direct voltages $E_{7a}$. The voltages $E_{7a}$ from the detector 29 are presented to modulator 31 and further converted to alternating voltages $E_a$. The voltages $E_a$ are presented to the electronic switch 34 and emitted therefrom by the integrator as output signals $E_2$. The alternating voltages $E_a$ are also applied to the amplifier 35 which is adapted to receive the output signals $E_b$ from the synchronizer B when they are available. The alternating voltage output from the amplifier 35 represents the instantaneous difference between the alternating voltgaes $E_a$ and $E_b$, and is presented to the amplifier 12. The integrator is now in state 1 of its initial operating cycle.

The first pulse $P_1$ passing through the connection 36 and the OR gate 37 resets the flip-flop 38 which provides a low connection to de-energize the lines 40 and 45, and inactivates the control gates 15 and 16. No pulse signals are now applied to the transfluxors 21 or 22. In this condition for a time interval $T_0$, the integrator is in a guard state or the state 2 which prevents errneously altering the prior settings in the transfluxors 21 and 22 by transients.

After the delay period $T_0$, the flip-flop 38 is again reset by the arrival of the pulse through the delay line 36*a* and the OR gate 37 which re-energizes the line 40 and simultaneously resets the flip-flop 39 so that the line 44 is energized and the line 43 is de-energized. The integrator is now in state 3 wherein the gate 16 is activated through the energized lines 40, 44 and 46, and the AND gate 42. Simultaneously, the energized line 44 alters the states of the electronic switches 11 and 34. The output from the R.C. filter 14 is now connected to the pulse gate 18 through the gate 16. The gate 18 produces pulse signals $E_{5b}$ which are presented to a current drive circuit 20. The current drive circuit 20 applies current pulses to the control winding 24 to vary the magnetization of the transfluxor 22. The signals $E_{6b}$ produced by the transfluxor 22 are applied to the detector 30, converted to direct voltages $E_{7b}$ and applied to the modulator 32. The alternating output voltages $E_b$ from the modulator 32 pass through the switch 34 as the integrator output signals $E_2$. Simultaneously, the alternating voltages $E_b$ are applied to the amplifier 35 which has been continuously receiving the alternating voltages $E_a$ from the modulator 31 of synchronizer A. The amplifier 35 receiving the alternating voltages $E_a$ and $E_b$ applies alternating voltage signals to the amplifier 12 which are representative of $E_a$—$E_b$. The state of the switch 11, having been altered when the line 44 became energized and the line 43 became de-energized, passes voltages $E_{1a}$ to the amplifier 12.

The next pulse $P_1$ returns the integrator to a guard state or state 4 in which the flip-flop 38 provides a low connection to line 40. With the line 40 de-energized, the lines 45 and 46 are also de-energized and inactivate the gates 15 and 16 to interrupt reception of pulse signals by the transfluxors 21 and 22.

After delay period $T_0$, the delayed pulse from the line 36*a* again resets the flip-flop 38 and provides a high connection to re-energize the line 40. Simultaneously, the flip-flop 38 resets the flip-flop 39 which reverses the high/low connections of the lines 43 and 44. The integrator is now in state 1–X or the first state of the second X cycle.

The four states of the pulse control circuit P may be more clearly understood by referring the FIGURE 2 which graphically illustrates the pulse signals $P_1$ that have a pulse interval T, and the high/low connections of the lines 40, 43, 44, 45 and 46. Representative associated waveforms $E_1$, $E_a$, $E_b$ and $E_2$ are also included in this figure. The pulses, the waveforms and the connections of the various lines of FIGURE 2 are merely illustrative and are not to be construed as limiting the invention. FIGURE 2 is illustrative of the four states of the initial operating cycle, after the integrator has been reset by the lines 47 and 48, and the three following (X, Y and Z) cycles. It should be noted that the connections of the pulse control circuit P are the same in the same state of all cycles, therefore, the pulse control cycles are purely repetitious. As a result of the action of the integrator, at any given instant the magnetism of the transfluxor under control (the transfluxor connected to the integrator input $E_1$ and the output $E_2$) holds the algebraic sum of the present value of the input $E_1$ ($E_{1a}$ or $E_{1b}$) plus the output of the second transfluxor. The output of the transfluxor under control is, therefore, directly proportional to the integral of the input signal. The output signals $E_2$ of the integrator are provided by the electronic switch 34 as the output signals of the transfluxor under control, or the last transfluxor to be controlled.

The purpose of the guard states (states 2 and 4) is to provide a time delay during which both transfluxors are disconnected from the control signals to guard against spurious transients and to prepare for the next sampling command pulse. The closed loop sampled waveforms presented in FIGURE 2 represent a constant alternating voltage input $E_1$. The output voltage $E_2$ is based on the assumption that the electronic switch 31 is used to connect the output of the transfluxor 21 or the synchronizer A to the output of the integrator when the line 43 is energized, and to connect the output of the transfluxor 22 or the synchronizer B to the output of the integrator when the line 44 is energized. Under these conditions, the system approximates the transform $$\frac{1}{TS}$$

and the output changes every T seconds in response to the pulses $P_1$. It may be necessary to insert an attenuator in series with the integrator input $E_1$. This can be accomplished by an attenuator circuit (not shown) or in the center tapped transformer 10 (not shown) and the transform then becomes $$\frac{k}{TS}$$

With this arrangement, the number of command steps (changes in the output signals $E_2$) per second can be adjusted by varying the pulse interval T, after which, the attenuation $k$ can be adjusted to obtain the required overall integration constant. Utilizing 400 cycles per second, the system would require about 40 milliseconds to settle in response to a step command signal. The maximum number of command steps would result from about 20 pulses per second. An increase in the carrier frequency (frequency of $E_1$) would directly reduce the settling time and such a change would permit an increase in the integration sampling rate, or in the number of permissible command steps.

The integrator of FIGURE 1 has been described as receiving alternating voltage command signals $E_1$ with 0° phase angle. The transfluxors 21 and 22 are initially completely magnetically blocked oppositely to one another. To integrate signals $E_1$ when they are reversed, or have 180° phase angle, the transfluxors 21 and 22 are initially completely blocked oppositely to one another and in directions opposite to that previously described.

The integrator of FIGURE 1 may be modified to provide initial bidirectional operation, or to provide integration of command signals $E_1$ with either 0° or 180° phase angles with bucking transformers or similar means which are associated with the output of the synchronizers A and B of the character shown and described in co-pending patent application Serial No. 738,491, filed May 28, 1958, and assigned to the same assignee of this patent application. As shown in FIGURE 3, a bucking transformer 49 is connected to the output of modulator 31 of synchronizer A and a similar transformer 50 is connected to the output of modulator 32 of synchronizer B. Initially the transfluxors 21 and 22 are completely blocked then partially unblocked to a level preferably midway between completely blocked and completely unblocked. The medial level of magnetization of the transfluxors should be equal. The transfluxors will then produce a signal when excited by the alternating current from circuit 33. The resulting alternating voltages $E_a$ and $E_b$ are then bucked out by the transformers 49 and 50. With the transfluxors 21 and 22 partially blocked and the transformers 49 and 50 nulling the signals $E_a$ and $E_b$, the synchronizers A and B are in a simulated quiescent state and are capable of integrating command signals $E_1$ of either phase angle.

Although but several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. An integrator having an input adapted to receive command signals and having an output for providing voltages corresponding to the integral of the command signals, comprising a pair of synchronizers, each synchronizer having an input and an output, the outputs of the synchronizers being connected together and to the input of the integrator, means alternately connecting the inputs of the synchronizers to the input of the integrator for applying control signals to the connected synchronizer input corresponding to the algebraic sum of the command signals and voltages at the outputs of the synchronizers, and means for alternately connecting the outputs of the synchronizers to the output of the integrator.

2. An integrator having an input adapted to receive command signals and having an output for providing voltages corresponding to the integral of the command signals, comprising a pair of synchronizers, each synchronizer having an input and an output, the outputs of the synchronizers being connected together and to the input of the integrator, means alternately connecting the inputs of the synchronizers to the input of the integrator for applying control signals to the connected synchronizer input corresponding to the algebraic sum of the command signals and voltages at the outputs of the synchronizers, and means for connecting the output of the integrator to the output of the synchronizer having its input connected to the input of the integrator.

3. An integrator according to claim 2 in which each synchronizer includes a transfluxor as a memory device.

4. An integrator according to claim 2 in which the first connecting means provides a time interval between disconnecting one synchronizer input and connecting the other sychronizer input.

5. An integrator as described in claim 2 in which the first connecting means provides a time interval between disconnecting one synchronizer input and connecting the other synchronizer input, and in which the second connecting means continues the connection during the time interval between the output of the integrator and the output of the synchronizer.

6. An integrator having an input adapted to receive command signals, comprising a pair of transfluxors initially blocked oppositely to one another, each transfluxor producing signals at its output in accordance with the amount of blocking and having its output connected to the input of the integrator, control means, and gating means operated by the control means for alternately connecting the transfluxors to the input of the integrator to apply control signals to the transfluxors corresponding to the algebraic sum of the command signals and the signals from the transfluxors for varying the amount of blocking, and means connected to the input of the integrator for reversing the phase of the command signals upon connecting one of the transfluxors to the input of the integrator.

7. An integrator according to claim 6 having an output, and switching means operable by the control means for connecting the output of the integrator to the output of the transfluxor receiving the control signals.

8. An integrator according to claim 7 in which the control means operates the gating means to disconnect the connected transfluxor from the input of the integrator prior to operating the switching means for disconnecting the output of the same transfluxor from the output of the integrator.

9. An integrator having an input adapted to receive command signals, comprising a pair of transfluxors, each transfluxor being initially partially blocked by a medial amount of magnetization and producing signals at its output in accordance with the amount of magnetization, means connecting the output of each transfluxor to the input of the integrator and nulling the transfluxor signals produced in accordance with the medial amount of magnetization to create a simulated quiescent state for each transfluxor, control means, and gating means operated by the control means to alternately connect the transfluxors to the input of the integrator for applying control signals to the transfluxors corresponding to the algebraic sum of the command signals and the signals from the transfluxors for varying the amount of magnetization.

10. An integrator according to claim 9 having an output, and switching means operable by the control means for connecting the output of the integrator to the nulling means connected to the transfluxor that is receiving the control signals.

11. An integrator according to claim 10 in which the control means operates the gating means to disconnect the connected transfluxor from the input of the integrator prior to operating the switch means to disconnect the output of the integrator from the connected nulling means.

12. An integrator having an input adapted to receive alternating voltage command signals, comprising a pair of transfluxors initially completely magnetically blocked oppositely to one another, each transfluxor producing signals at its output in accordance with the magnetization, means converting the transfluxor signals to alternating voltages and connecting the outputs of the transfluxors to the input of the integrator, means connected to the input of the integrator to provide control signals corresponding to the algebraic sum of the command signals and the alternating voltages, control means, and gating means operable by the control means for alternately connecting the transfluxors to the signal means for varying magnetization of the connected transfluxor in response to the control signals, and switching means operable by the control means for reversing the phase of the command signals upon operation of the gating means.

13. An integrator according to claim 12 having an output, and switching means operable by the control means for connecting the output of the integrator to the means providing alternating voltages that is connected to the output of the transfluxor receiving control signals.

14. An integrator in accordance with claim 13 in which the control means operates the gate means to disconnect the connected transfluxor from the means providing control signals prior to operating the switching means to disconnect the output of the integrator from the connected means providing alternating voltages.

No references cited.